April 21, 1970  R. VIGNAUD  3,507,708
ELECTRIC CELL WITH GAS PERMEABLE VENT STOPPER
Filed Sept. 19, 1967
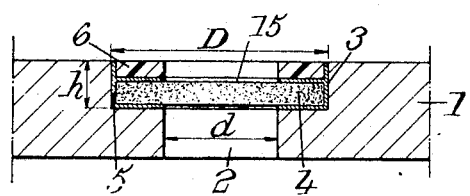
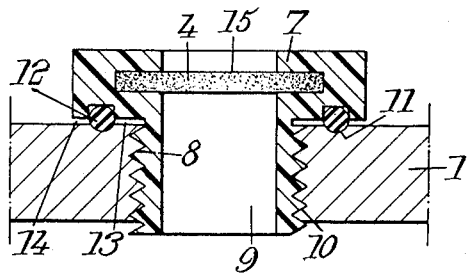
INVENTOR
RENE' VIGNAUD
BY *William W Stokes*
ATTORNEY

# United States Patent Office 3,507,708
Patented Apr. 21, 1970

3,507,708
**ELECTRIC CELL WITH GAS PERMEABLE
VENT STOPPER**
René Vignaud, Aulnay-sous-Bois, France, assignor to Les
Piles Wonder, Saint-Ouen, France
Filed Sept. 19, 1967, Ser. No. 668,828
Claims priority, application France, Sept. 22, 1966,
77,357, Patent 1,501,835
Int. Cl. H01m 1/06; B65d 51/16
U.S. Cl. 136—177
4 Claims

ABSTRACT OF THE DISCLOSURE

The membrane is made of a microporous piece of a perhalogenated aliphatic hydrocarbon, preferably polytetrafluoroethylene or polytrifluoromonochloroethylene, with respect to which the angle of wetting or contact of the liquid to be stopped is substantially greater than 90°. This membrane can form part of a stopper for primary or secondary cells for preventing the escape of the liquid electrolyte from such cells, while permitting the escape of gases produced in the cells.

---

This invention relates to membranes impermeable to liquids but permeable to gases. The invention is more especially concerned with membranes disposed in the wall of a primary or a secondary cell to allow the gases released inside the primary or secondary cell to pass through, without allowing the electrolyte which is contained in the cell to pass through.

An object of the invention is to improve such membranes with respect to both their impermeability to liquids and their high permeability to gases, with the supplementary double advantage of good mechanical resistance and low cost.

A membrane according to the invention, impermeable to liquid, but permeable to gases, is made of a microporous perhalogenated aliphatic hydrocarbon, in particular polytetrafluoroethylene or polytrifluoromonochloroethylene, with respect to which the angle of wetting or contact of the liquid is substantially greater than 90°.

The invention also comprises certain mountings of this membrane illustrated in the drawings, as well as a process for manufacturing such a membrane.

A particularly suitable application of the invention is in primary cells having a liquid, in particular alkaline, electrolyte.

The invention will be readily understood from the following detailed description, given merely by way of example, in connection with the accompanying drawings, in which FIGURES 1 and 2 illustrate, in section, two particular embodiments (given by way of non-limiting example) of stopper mountings, in particular for electric primary cells, comprising a membrane provided with the improvements according to the invention.

Before explaining the invention in detail, it is useful to recall the uses of membranes, walls or stoppers, which are permeable to gases but impermeable to liquids.

To give some examples of the cases in which such membranes, walls or separators are applicable, the following can be mentioned:

The purification of a gas containing liquid particles in suspension;

Packagings or containers which should be impermeable to the liquid that they enclose, while permitting the passage towards the outside (or possibly from the outside towards the inside) of a vapour or of a gas;

Primary or secondary electric cells in which a gaseous release takes place.

It is this latter case which is going to be examined in more detail, for the invention is particularly applicable to secondary cells and even more particularly to primary electric cells.

It is known that gas (in particular hydrogen) forms in primary and secondary cells, either during the periods of storage or during the periods of use and a recharging, the formation of gas being particularly large when a secondary cell is subjected to prolonged overcharge.

Several means have been advocated to permit the easy escape of the gases formed in a primary or secondary cell without permitting the corrosive electrolyte from spilling out by following the same path as the gases.

Plugs are frequently used, particularly in lead secondary cells, which plugs are provided with a channel of tortuous shape due to baffles, which are intended to break the jet or layer of electrolyte which would have a tendency to escape through the chanel during accidental upsetting of the secondary cell or during periods of gas release.

However, such plugs having a tortuous channel, if they allow the gases to pass through well enough, do not achieve sufficiently tight stopping of liquids, and the extremely corrosive electrolyte can contaminate the walls of the primary or secondary cell.

It has also been proposed, in the case of primary electric cells, to stop a hole, formed in the wall, by a film or membrane of a thin, non-porous plastic material through which the gases could diffuse whereas the liquid would be stopped. Such films are nevertheless rather ineffective, for if it is desired to give them sufficiently mechanical solidity, they must have a thickness such that, taking into account their very low coefficient of permeability or diffusion with respect to gases, they are no longer able to permit sufficient evacuation of the gases formed inside the primary cells.

It has also been proposed to use a membrane of microporous polyethylene having a layer of polymeric silicone deposited thereon. Such a membrane is impermeable to liquid, but permeable to gas.

The applicant has found with surprise that it is possible to make a membrane which is impermeable to a liquid but permeable to gases of a microporous perhalogenated aliphatic hydrocarbon, in particular polytetrafluoroethylene or polytrifluoromonochloroethylene, with respect to which the angle of wetting or contact of the liquid is substantially greater than 90°.

According to the studies carried out by the applicant, it would seem that this extremely important property could be explained as follows, although it is understood that the invention is in no way tied to or limited by this explanation:

It is known that, in a porous membrane, if the maximum radius of the pores is designated by $r$ and the surface tension of the liquid at the contact of the material constituting the membrane is designated by $s$, for an angle of contact $c$ greater than 90°, the force $t$ of the surface tension is given by the formula:

$$t = 2\pi r s \cos c$$

Leakage, that is to say passage of the liquid through the membrane, is then only possible if the liquid exerts a force of pressure P greater than the force of the pressure $p$ developed by the surface tension $t$ (thus equal to $t/\pi r^2$, that is to say if $$P > \frac{2s \cos c}{r}$$

this pressure P resulting either from the simple hydrostatic pressure of the liquid or from the pressure of the gas applying the liquid against the membrane.

This latter inequality shows that, for a liquid of given surface tension $s$, the pressure P which the membrane can withstand, without liquid leakage, is all the higher as the angle of contact $c$ between the liquid and the material forming the membrane is higher and as the radius $r$ of its pores is smaller.

It can thus be seen that it is appropriate to choose a material, for forming the membrane, having the highest possible angle of contact with the liquid to be stopped, which has, if possible, a high surface tension. It is then possible, if $c$ and $s$ have high known values, to regulate the porosity, that is to say $r$, to a value such that the liquid which can be subjected to the maximum pressure P, does not pass through.

The determination of the porosity of the membrane fixes the speed of passage of the gas per unit surface of the membrane. Thus the dimensions of the porous membrane can be calculated in order to permit the desired rate of evacuation of the gas.

An example will now be given of an embodiment of a membrane provided with the improvements according to the invention, applicable in particular for stopping a primary cell containing a liquid electrolyte. It has been indicated above that most primary cells contain constituents having the tendency, either during storing, or during operation, to form gases (in particular hydrogen) that it is necessary to evacuate to the atmosphere without risking deformation or deterioration of the cell under the effect of the increase of the internal pressure. On the other hand, the cell should be impermeable to the electrolyte, the passage for the gases not permitting the passage of the electrolyte when, by accident, the cell is tipped over and the electrolyte comes to the level of the passage. In the case of the invention, such a passage is stopped by a membrane of the type described above. It can even be useful to provide in the wall of the cell two or more membranes, for in the case of a single membrane, this membrane could, in certain positions of the cell, be in contact solely with the electrolyte, the pocket of gas not being able to be evacuated through the single membrane, whereas, on the contrary, in the case of two or more membranes, these membranes are disposed so that at least one of them is in contact with the gas to be evacuated in any position of the cell.

The following examples concern especially the case where the electrolyte is alkaline electrolyte, comprised for example by a concentrated solution of potassium hydroxyde containing a certain proportion of potassium zincate. Such an electrolyte can have a specific weight of 1.455 g./cm.$^3$ and a surface tension of 85 dynes/cm. It will be considered, besides, that in the primary cell the pressure P, with which the liquid bears against the membrane forming the device for stopping the liquids, is lower than 14.2 millibars, when the cell is tipped over. In these conditions, it can be shown that with a membrane of polytetrafluoroethylene (in abbreviation P.T.F.E.), whose angle of contact with respect to the electrolyte is 110°, the membrane should have pores smaller than 40 microns, to prevent the passage of the electrolyte while allowing the gases to pass. This membrane can be made as follows:

EXAMPLE 1

A perfectly homogeneous mixture is made of powdered P.T.F.E. and a swelling agent (such as ammonium bicarbonate, nitro dicarbonamide, unicell or any other similar pore-forming product). For example, 20 to 40 parts by weight of P.T.F.E. can be mixed with 80 to 60 parts by weight of ammonium bicarbonate, a preferred composition being obtained by mixing 30 parts by weight of P.T.F.E. and 70 parts by weight of ammonium bicarbonate, the maximum diameter of the particles being 40 microns and preferably of the order of 10 microns.

This perfectly homogeneous mixture is introduced into a mould in the amount of 2 g. per dm.$^2$, then compressed under a pressure of from 10 to 40 metric tons/ dm.$^2$ (preferably 30 metric tons/dm.$^2$). Once compressed, the mould-mixture combination is brought for half an hour to 400° C. while remaining subjected to a pressure of from 0.5 to 3 kg./dm.$^2$ (preferably 1.6 km./dm.$^2$).

After cooling, the membrane is removed from the mould and is ready to be used. Different mountings of this membrane in the wall of the primary cell of the type mentioned above can be provided. In the accompanying drawings, two of these mountings have been shown by way of non-limiting example.

A membrane of P.T.F.E. can also be manufactured by the following process:

EXAMPLE 2

A mixture is prepared containing 1 to 10 parts (preferably 2.5 parts) of an aqueous suspension of P.T.F.E. having 30% solid material, with 1 to 10 parts (preferably 2 parts) of a swelling agent such as nitrodicarbonamide, and this suspension is diluted by means of 17.5 parts of water. The suspension is then jelled by means of 0.05 to 0.5 part (preferably 0.2 part) of a jellifying agent, for example polyvinyl alcohol such as Carbopol 960 (carboxypolymethylene).

The jelled suspension is spread in a uniform layer of the desired thickness on a smooth and horizontal plate. After evaporation of the water, this layer is heated for a quarter of an hour at 400° C. After cooling, the layer can be separated from its support, and cut to the desired shape.

It will be noted that this latter process is particularly suitable for manufacturing very thin membranes, which are necessary for satisfying certain requirements with respect to cumbersomeness.

In the mounting of FIGURE 1, a cylindrical hole or opening 2 is provided in the upper wall 1 (for example of polystyrene or polyvinyl chloride) for example of a primary cell. The opening 2 has a diameter $d$ determined by the area $\pi d^2/4$ calculated as indicated above from the rate of flow of the gas to be transmitted, for the maximum pressure P, the surface tension $s$ and the angle of contact $c$. A cylindrical recess 3 is also provided, this recess 3 extending to about half the thickness of the wall; the recess 3 is co-axial with the opening 2 and of diameter D greater by about 10 mm. than the diameter $d$.

From a membrane manufactured as indicated above, a disc 4 is cut out of diameter very slightly less than D, and this disc is glued at the bottom of the recess 3 by means of a layer of glue 5 containing a solvent wetting the P.T.F.E. This glue (comprised for example from 75 g. of polystyrene put in solution with 50 ml. of trichloroethylene added to 50 ml. of methylisobutylacetone) is fluid enough to penetrate into the pores of the disc 4, on the periphery of the disc in contact with the wall 1 with which the glue must have good adherence. A ring 6 of a polymer compatible with the glue forming layer 5 is then applied on the upper periphery of the disc 4, the exterior diameter of this ring 6 being identical with the diameter of the disc, whereas the interior diameter of this ring is identical wth the diameter $d$ of the opening 2. In addition, the sum of the thicknesses of the disc 4 and the ring 6 is substantially equal to the height $h$ of the recess 3, the glue mentioned above also serving to make the ring 6 adhere to the disc 4 and to the periphery of the wall 1.

In the embodiment of FIGURE 2, the disc 4, of a semi-permeable membrane provided with the improvements according to the invention, is disposed in a plug 7 of a plastic material such as polystyrene. This plug, which comprises a thread 8, has substantially the form of a bolt through which a channel 9 passes, this channel 9 being blocked off by the disc 4. The plug or bolt 7 is screwed into the wall 1 which comprises for this purpose a threaded opening 10.

To assure an impermeability as good as possible with respect to liquids: on the one hand, the disc 4 is impregnated, on its periphery, with a solution of the plastic material (such as polystyrene) forming the plug 7, in an appropriate solvent, for example a solution of 25 g. of polystyrene in 50 ml. of trichloroethylene, and on the other hand, an annular groove 11 is machined in the lower surface of the plug 7 and in the upper surface of the wall 1, and a toroidal seal 12, of an appropriate elastomer which is not attachable by the electrolyte, is housed in this groove, the plug 7 being tightened to deform the seal 12 thus preventing any passage of liquid through the thread and the zone 13 towards the zone 14.

In certain cases, in particular in primary and secondary cells, it is advantageous to cover the face 15 of the membrane (in the mountings of FIGURES 1 and 2 or in other mountings), which is in contact with the outside or atmosphere, with the film of selective permeability with respect to gases, this permeability being for example such that it allows the gases formed inside the cell (essentially hydrogen) to pass towards the outside, while preventing the oxygen in the air from penetrating from the outside towards the inside of the cell, where it could deteriorate the negative electrodes by corrosion.

It should be noted that this supplementary film can be sufficiently thin to permit the easy passage of the gases produced inside the primary or secondary cell by the fact that it is supported by the membrane provided with the improvements according to the invention. Moreover this membrane prevents the electrolyte from reaching the surface of the film, which is very advantageous for the wetting of the film by the electrolyte would have the effect of slowing down considerably the evacuation of the gases towards the outside.

This film having selective permeability can be for example made of regenerated cellulose, ethylcellulose, polyethylene, or even, in certain cases, be formed by an extremely thin film of palladium (thickness of the order of a micron).

As a result, whatever embodiment is adopted, the present invention provides a membrane which is impermeable to liquids but permeable to gases, whose operation is sufficiently clear from the foregoing so that no further explanation is necessary. The membrane according to the invention has certain advantages with respect to existent membranes, in particular the following advantages:

First of all the membrane has a substantially absolute impermeability to liquids, in particular to electrolytes.

It is highly permeable to gases, in particular hydrogen.

It has excellent mechanical resistance.

Its cost is low.

Its permeability per unit of surface area can be determined in advance in a fairly precise manner.

The excellent properties of a membrane of P.T.F.E. manufactured by the process of Example 1 have been verified as follows:

A tubular container of Plexiglas, having the form of a cylinder of revolution generated by vertical generatrices, was mounted in a manner to be able to turn about a horizontal axis perpendicular to its axis of symmetry. This container could be fed with fluid through a horizontal inlet conduit disposed along its axis of rotation. The container was closed at its two free ends (upper and lower ends) by two semi-permeable membranes, manufactured as indicated in Example 1 and glued to the container. These membranes were re-enforced on the outside by metal grills to increase their rigidity.

An aqueous solution having 45% potassium hydroxide was introduced by the conduit into the container, to a height of 5 cm. corresponding substantially to a third of its height.

In a first position of the container, hydrogen was passed through the conduit into the container with a flow of 1 liter per cm.$^2$ of membrane surface per minute, and it was noticed that the hydrogen passed freely through the upper semi-permeable membrane M$u$. By contrast the solution did not pass through the lower semi-permeable membrane M$l$, which remained perfectly impermeable to the liquid and was not attacked by the liquid during four weeks.

After this lapse of time, the container was turned upside down by rotation through 180° about its axis, so that the membrane M$u$ occupied the lower position and the membrane M$l$ the upper position, and the introduction of the gas was begun. The membrane M$l$, which was previously wetted by the aqueous solution, allowed the hydrogen to pass through freely, whereas the membrane M$u$ remained impermeable to the liquid.

At the end of four weeks, the container was again turned upside down and the operation was repeated with the same advantageous result.

It should be pointed out that the semi-permeable membrane according to the present invention, which is impermeable to liquids but permeable to gases, can be used in other applications than primary and secondary cells; for example, these membranes can be used in packings or containers preserving, in an impermeable manner, a liquid, but allowing gases to pass through, or in liquid/gas separators.

In certain cases, the efficiency of a membrane of the type mentioned above can be increased by using an electrolyte (or other liquid) having a higher surface tension than the electrolyte (or other liquid) ordinarily used, so as to increase $s$ in the formulas given above.

Although the invention has been described with reference to a particular application (primary and secondary cells) and with reference to particular embodiments, the invention should not be limited thereto, as modifications could be made without departing from the spirit or the scope of the invention.

What I claim is:

1. In an electric cell containing a liquid electrolyte, a vent stopper comprising a membrane which is impermeable to said liquid but permeable to gases, comprising a microporous piece of a perhalogenated aliphatic hydrocarbon with respect to which the angle of contact of said liquid is substantially greater than 90°, said stopper being fit into an opening in an external wall of said cell, whereby one face of said membrane can communicate with said liquid electrolyte contained in said cell, and the other face of said membrane communicates with the atmosphere, said membrane being impermeable to said liquid electrolyte to prevent escape of said liquid electrolyte through said membrane, and said membrane being permeable to gases produced in said cell to permit the escape of said gases through said membrane to the atmosphere, said other face of said membrane, which communicates with the atmosphere, being provided with a film of selective permeability with respect to gases, said film being more permeable to at least some of the gases produced in said cell than to at least some of the gases contained in the surrounding atmosphere.

2. A stopper according to claim 1 in which said film is more permeable to hydrogen than to oxygen.

3. A stopper according to claim 1 in which said film comprises a material chosen from the group consisting of regenerated cellulose, ethylcellulose and polyethylene.

4. A stopper according to claim 1 in which said film comprises a film of palladium of thickness of the order of a micron.

References Cited

UNITED STATES PATENTS

| | | | |
|---|---|---|---|
| 2,819,209 | 1/1958 | Pall et al. | 260—2.5 XR |
| 3,033,911 | 5/1962 | Duddy | 136—177 |
| 3,159,508 | 12/1964 | Chreitzberg | 136—177 XR |
| 3,360,403 | 12/1967 | Halsall | 136—177 XR |
| 3,394,069 | 7/1968 | Solomons | 260—2.5 XR |

FOREIGN PATENTS

| | | |
|---|---|---|
| 129,660 | 11/1945 | Australia. |
| 152,854 | 8/1951 | Australia. |
| 877,785 | 5/1953 | Germany. |

WINSTON A. DOUGLAS, Primary Examiner

D. L. WALTON, Assistant Examiner

U.S. Cl. X.R.

220—44; 55—524